(12) United States Patent
Higuchi

(10) Patent No.: US 7,062,970 B2
(45) Date of Patent: Jun. 20, 2006

(54) ELECTROSTATIC VIBRATION DEVICE

(75) Inventor: Hirofumi Higuchi, Okazaki (JP)

(73) Assignee: Denso Corporation, Kariya (JP)

( * ) Notice: Subject to any disclaimer, the term of this patent is extended or adjusted under 35 U.S.C. 154(b) by 138 days.

(21) Appl. No.: 10/718,630

(22) Filed: Nov. 24, 2003

(65) Prior Publication Data
US 2004/0135466 A1    Jul. 15, 2004

(30) Foreign Application Priority Data
Jan. 14, 2003   (JP)   ............... 2003-005749

(51) Int. Cl.
*G01P 9/04* (2006.01)

(52) U.S. Cl. .................................... 73/504.12; 331/154
(58) Field of Classification Search ............. 73/504.12, 73/504.14; 310/309; 331/154
See application file for complete search history.

(56) References Cited

U.S. PATENT DOCUMENTS

| | | | |
|---|---|---|---|
| 5,780,740 A * | 7/1998 | Lee et al. | 73/504.12 |
| 5,895,852 A * | 4/1999 | Moriya et al. | 73/504.12 |
| 6,240,780 B1 * | 6/2001 | Negoro et al. | 73/504.12 |
| 6,450,033 B1 | 9/2002 | Ito et al. | |
| 6,494,096 B1 | 12/2002 | Sakai et al. | |
| 6,507,138 B1 * | 1/2003 | Rodgers et al. | 310/309 |

* cited by examiner

*Primary Examiner*—John E. Chapman
(74) *Attorney, Agent, or Firm*—Posz Law Group, PLC

(57) ABSTRACT

A vibrator has a frame portion having a planar frame shape, an in-frame fixed portion which is fixed to a base portion and located in the inner space surrounded by the inner periphery of the frame portion, and a driving electrode comprising a first driving electrode disposed so as to confront the outer peripheral portion of the vibrator, and a second driving electrode which is equipped to the in-frame fixed portion so as to confront the inner peripheral portion of the frame portion, and the back-side portion of the in-frame fixed portion and the inner peripheral portion of the frame portion confronting the back-side portion are designed in an unevenly-shaped portion.

14 Claims, 7 Drawing Sheets

ELECTROSTATIC VIBRATION DEVICE

CROSS REFERENCE TO RELATED APPLICATION

This application is based upon, claims the benefit of priority of, and incorporates by reference the contents of, Japanese Patent Application No. 2003-5749 filed on Jan. 14, 2003.

FIELD OF THE INVENTION

The present invention relates to an electrostatic vibration device for driving a vibrator with electrostatic force so that the vibrator vibrates (hereinafter referred to as "driving-vibration"), and is applicable to an electrostatic vibration type angular velocity sensor, an actuator, etc.

BACKGROUND OF THE INVENTION

As an electrostatic vibration type device is proposed an electrostatic vibration type angular velocity sensor in which a base portion, a vibrator and an exciting electrode for driving the vibrator are formed by etching a semiconductor substrate (for example, see JP-A-2001-91265 (pp4–5, FIG. 1)).

According to this angular velocity sensor, the vibrator is driven (excited) to vibrate in a predetermined driving direction by the driving electrode, and under application of an angular velocity, the vibrator is vibrated in a direction (detecting direction) perpendicular to the driving direction by Coriolis force. The applied angular velocity is detected on the basis of the vibration in the detecting direction.

The present invention has manufactured a prototype of an electrostatic vibration type angular velocity sensor as described above, and made various studies on the prototype.

FIG. 7 is a schematic plan view showing the construction of an angular velocity sensor as a first prototype manufactured on the basis of the related art described above.

This prototype may be manufactured by a well-known semiconductor manufacturing technique using a SOI (silicon on insulator) substrate 10 having two silicon substrates attached to each other through an oxide film. FIG. 7 also shows one silicon substrate (semiconductor substrate) 12 having a planar shape. Grooves are formed on the one silicon substrate 12 by etching to form respective parts.

A vibrator 30 is disposed on an opening portion 14 which is formed by partially removing the oxide film supporting one silicon substrate 12 and the other silicon substrate. The vibrator 30 is fixed to a base portion 20 located around the outer periphery of the opening portion 14 through driving beams 33 which are designed to be deformable elastically (like spring) in an x-direction of FIG. 7. The base portion 20 is formed of the oxide film and the other silicon substrate.

Furthermore, comb-shaped driving electrodes 40, 41 for applying electrostatic force to the vibrator 30 to drive and vibrate the vibrator 30 in the x-direction are fixed to the base portion 20. The driving electrodes 40, 41 are disposed so as to confront the outer peripheral portion of the vibrator 30. In addition, comb-shaped portions 30a are equipped to the vibrator 30 at the portions thereof facing the driving electrodes 40, 41 so that the comb-shaped portions 30a are engaged with driving electrodes 40, 41.

In FIG. 7, a detecting poise portion 32 is formed at the center portion of the vibrator 30 so as to be linked to the right and left sites (plane-shaped portions) of the vibrator 30 through detecting beams 34 deformable in the y-direction (like spring). Furthermore, detecting electrodes 50 are formed at the base portion 20 so as to face the detecting poise portion 32.

In the electrostatic vibration type angular velocity sensor shown in FIG. 7, when a constant voltage is applied to the vibrator 30 and alternating voltages (driving signals) which are opposite in phase are applied to the right and left driving electrodes 40, 41 respectively, the overall vibrator 30 is driven to vibrate in the x-direction by the driving beams 33.

When an angular velocity Ω is applied under the driving-vibration of the vibrator 30, Coriolis force acting in they-direction occurs in the vibrator 30, and the detecting poise portion 32 supported by the detecting beams 34 in the vibrator 30 vibrates in the y-direction by the Coriolis force (hereinafter referred to as "detecting-vibration"). At this time, the electrostatic capacitance between the detecting electrodes 50 and the detecting poise portion 32 is varied due to the detecting vibration. The magnitude of the angular velocity Ω can be determined by detecting the capacitance variation.

Since Coriolis force is proportional to the vibration speed of the driving-vibration of the vibrator 30, it is required to increase the vibration speed in order to enhance the sensitivity of the angular velocity and thus detect the angular velocity with high precision. Therefore, it is required to increase the number of driving electrodes and thus intensify the driving force, that is, the electrostatic force. For example, it is required in the sensor shown in FIG. 7 to increase the number of comb teeth of the driving electrodes 40, 41.

However, if the number of driving electrodes is merely increased, the body size of the substrate constituting the sensor is increased, and this is unfavorable. Therefore, the inventor of this invention has produced an electrostatic vibration type angular velocity sensor as shown in FIG. 8 as a second prototype.

The second prototype is achieved by modifying the right and left sites of the vibrator 30 of the first prototype shown in FIG. 7 so that each plane-shaped portion is designed as a frame portion 31 having a frame shape. Furthermore, a part of each of driving electrodes 40, 41 fixed to the base portion 20 is located in the inner space surrounded by the inner periphery of each frame portion 31 and serves as an in-frame fixed portion 60, so that each of comb-shaped driving electrode 40b, 41b is also equipped to the in-frame fixed portion 60 surrounded by the frame portion 31.

That is, the driving electrodes 40, 41 of the second prototype comprise the first driving electrodes 40a, 41a which are disposed so as to confront the outer peripheral portion of the vibrator 30, and the second driving electrodes 40b, 41b which are equipped to the in-frame fixed portions 60 so as to confront the inner peripheral portions of the right and left frame portions 31, respectively.

As described above, the number of driving electrodes which are designed to have a high area efficiency can be increased by adopting the structure that the vibrator 30 is designed in a frame-shape structure and the driving electrodes are also equipped in the inner spaces surrounded by the inner peripheral portions of the frame portions 31. Accordingly, the electrostatic force applied to the vibrator 30 may also be increased by the increased number of the comb teeth because of provision of the second driving electrodes 40b, 41b.

In the construction of FIG. 8, however, electrostatic force acting in the opposite direction to the electrostatic force caused by the driving-vibration acts in the gap (hereinafter referred to as "confronting back-side gap") 70 between the back side portion 60a of each in-frame fixed portion 60 at the opposite side to the teeth-arrangement portion of the corresponding second driving electrode 40b, 41b and the inner peripheral portion of the corresponding frame portion 31 facing the back side portion 60a.

Accordingly, even when the number of driving electrodes is increased, the driving force and the driving-vibration speed are not increased in conformity with the increase of the number of driving electrodes. This problem occurs commonly not only when increase of the driving force is intended in the electrostatic vibration type angular sensor, but also when it is intended in the electrostatic vibration type device having the structure that the vibrator is designed in a frame shape and the driving electrodes are equipped in the frame.

SUMMARY OF THE INVENTION

Therefore, the present invention has been implemented in view of the foregoing problem, and has an object to properly increase driving force while suppressing increase in body size as much as possible in an electrostatic vibration type device in which a base portion, a vibrator and driving electrodes are formed by etching a substrate.

In order to increase the driving force for driving vibration of a vibrator, it is required to reduce the electrostatic force (that is, electrostatic attractive force) acting on the gap between the confronting back side portions. In order to satisfy this requirement, the gap between the confronting back side portions may be increased simply.

This is because the electrostatic force (electrostatic attractive force) is inversely proportional to the square of the distance between objects. If the gap between the confronting back side portions is increased, that is, the etching width is increased in a type the constituent parts such as the vibrator, the driving electrodes, etc., various troubles would occur.

For example, when the etching width is excessively large at some portion of the substrate, there occurs a disadvantage that productivity is lowered because the etching speed is reduced, etching residue is liable to occur, or other portions having narrow etching width are over-etched. Therefore, it is better to restrict the etching width to some fixed value over the substrate.

Therefore, as a result of the inventor's enthusiastic studies, it has been discovered that the faces confronting through the confronting back-side gap are designed in an evenness shape in order to reduce the electrostatic force in the confronting back-side gap when the etching width restriction is taken into consideration.

That is, if the width of a recess (the gap between neighboring projecting portions) is set to be not more than the upper limit of a predetermined etching width when an unevenness shape portion is formed by etching, recess portions are properly etched, and the distance between the confronting portions can be increased at the recess portion by the amount corresponding to the depth of the recess portion.

The present invention has been implemented on the basis of the results of the studies describe above.

That is, according to a first aspect of the present invention, an electrostatic vibration type device having a base portion, a vibrator which is movably equipped to the base portion so as to vibrate in a predetermined direction (x), and at least one driving electrode for applying electrostatic force to the vibrator to drive the vibrator fixed to the base portion so that the vibrator vibrates in the predetermined direction, the base portion, the vibrator and the driving electrode being formed by etching a substrate, is characterized in that the vibrator has at least one frame portion designed to have a planar frame shape and at least one in-frame fixed portion that is fixed to the base portion and located in the inner space surrounded by the inner peripheral portion of the frame portion, the at least one driving electrode comprises a first driving electrode disposed so as to confront the outer peripheral portion of the vibrator and a second driving electrode which is equipped to the in-frame fixed portion and disposed so as to confront the inner peripheral portion of the frame portion, and at least one site of a back-side portion of the in-frame fixed portion which is located at the opposite sides to the arrangement portion of the second driving electrode and the inner peripheral portion of the frame portion confronting the back side portion is designed to have an uneven shape (irregularities).

According to the first aspect, the vibrator is designed to have a planar frame shape and the second driving electrode is equipped in the inner space surrounded by the inner periphery of the frame portion, so that it is possible to suppress the increase of the body size of the substrate at maximum and increase the number of driving electrodes with high area efficiency.

The gap between the back-side portion of the in-frame fixed portion and the inner peripheral portion of the frame portion which confronts the back-side portion (i.e., the gap in the inner space) is increased at each recess portion of the unevenly-shaped portion, so that the electrostatic force acting in this gap can be reduced. Therefore, according to the present invention, the driving force can be properly increased with suppressing the increase of the body size as much as possible.

Furthermore, according to a second aspect of the present invention, both the sites of the back-side portion of the in-frame fixed portion and the inner peripheral portion of the frame portion which confronts the back-side portion are designed to have an uneven shape (irregularities).

When both the back-side portion of the in-frame fixed portion and the inner peripheral portion of the frame portion confronting the back-side portion are designed to have an uneven shape, the number of recess portions can be more increased as compared with the case where only one of them is designed in an uneven shape, and thus this is preferable.

According to a third aspect of the present invention, the frame portion is partially cut out to form a notch portion in the frame portion, and the in-frame fixed portion can be designed so as to extend from the portion thereof fixed to the base portion through the notch portion into the inner peripheral portion of the frame portion.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Preferred embodiments according to the present invention will be described hereunder with reference to the accompanying drawings.

Figure 1:
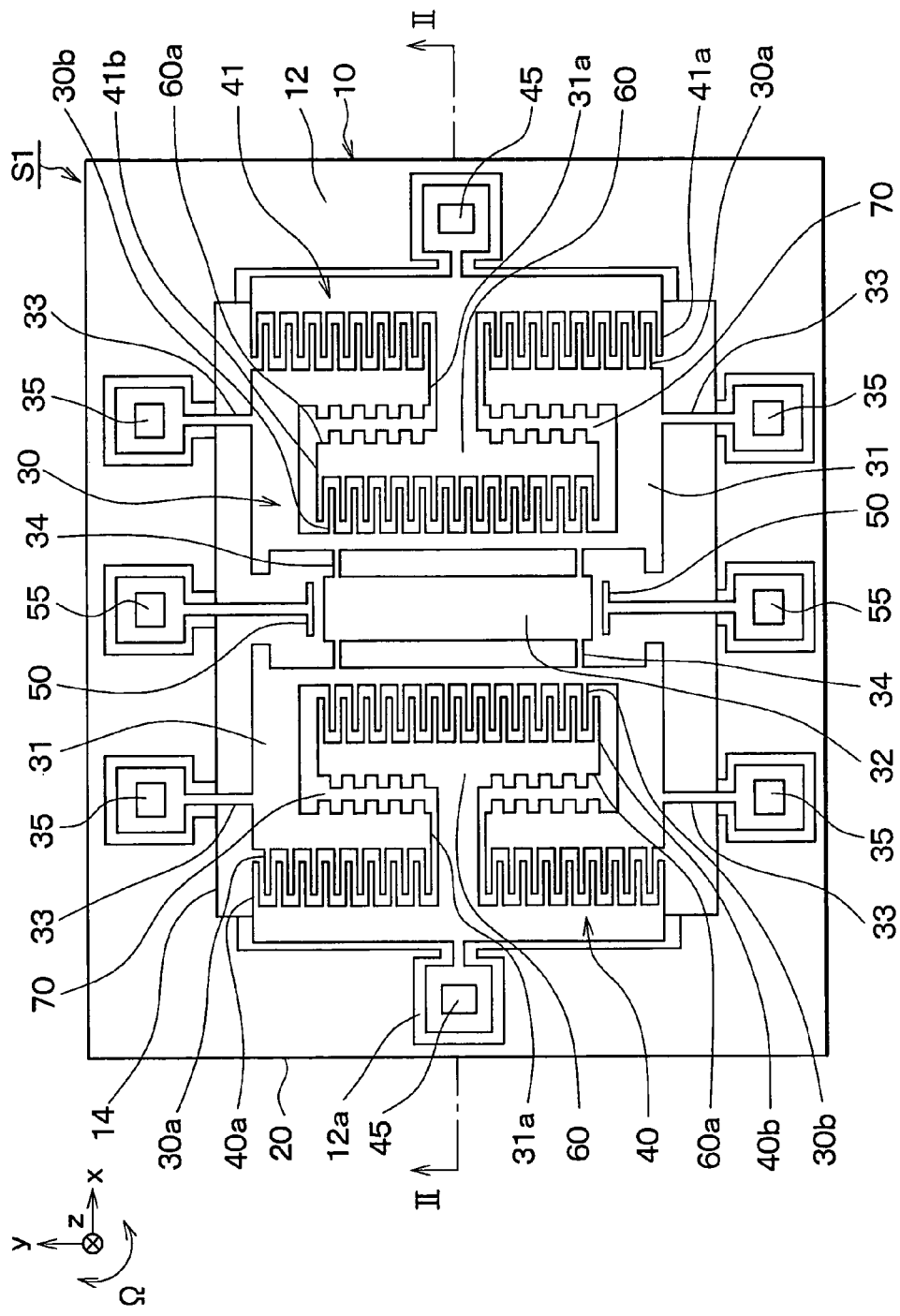
FIG. 1 is a schematic plan view showing an angular sensor according to an embodiment of the present invention.
Figure 2:
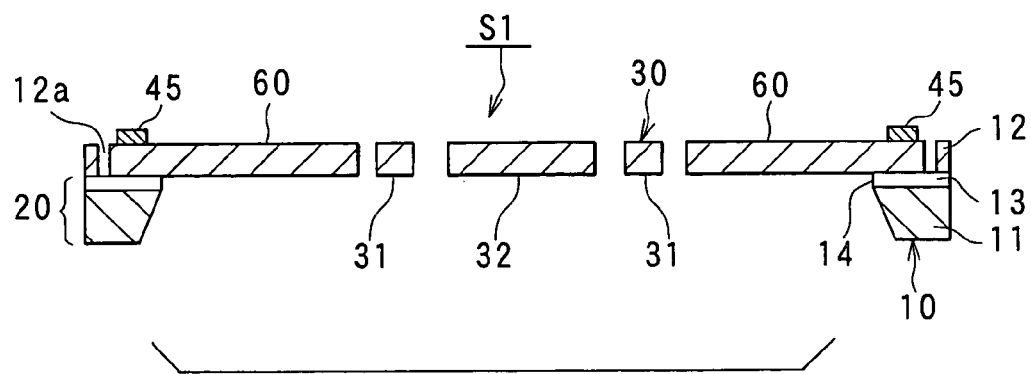
FIG. 2 is a cross-sectional view taken along A—A of FIG. 1.

FIG. 1 is a schematic plan view showing an angular sensor S1 as an electrostatic vibration type device according to an embodiment of the present invention, and FIG. 2 is a cross-sectional view taken along A—A of FIG. 1.

As shown in FIG. 2, the substrate constituting the angular sensor S1 is a rectangular SOI substrate 10 formed by laminating a second silicon substrate 12 on a first silicon substrate 11 through an oxide film 13.

Here, the second silicon substrate 12 is subjected to an etching treatment to form grooves 12a, thereby sectioning the second silicon substrate 12 into a vibrator 30, driving electrodes 40, 41, detecting electrodes 50, respective beams 33, 34, etc.

At the portion of the SOI substrate 10 which corresponds to the vibrator 30, the first silicon substrate 11 and the oxide film 13 are removed by etching and thus the opening portion 14 is formed. The first silicon substrate 11 and the oxide film 13 which surround the opening portion 14 are constructed as the support substrate, which will be referred to as the base portion 20.

The vibrator 30 comprises two frame portions 31 which are located at both the right and left sides of the second silicon substrate 12 whose planar shapes are designed as frame shapes (hereinafter referred to as "right and left frame portions"), and a planar rectangular detecting poise portion 32 disposed between the right and left frame portions 31. In this embodiment, the whole of the vibrator 30 is joined to the base portion 20 through four driving beams 33. Furthermore, in this embodiment, the detecting poise portion 32 is joined to the right and left frame portions 31 through four detection beams 34.

Here, the driving beams 33 substantially have the degree of freedom only in the x-direction, and the overall vibrator 30 is allowed to vibrate in the x-direction through the driving beams 33. In addition, the detecting beams 34 substantially have the degree of freedom only in the y-direction, and the detecting poise portion 32 of the vibrator 30 is allowed to vibrate in the y-direction through the detecting beams 34.

Furthermore, the driving electrodes 40, 41 are formed on the second silicon substrate 12 fixed to the base portion 20 so as to face both the respective outside portions of the right and left frame portions 31 in the x-direction. Furthermore, the driving electrodes 40, 41 serve to apply electrostatic force to the vibrator 30 to drive the vibrator 30 so that the overall vibrator 30 vibrates in the x-direction. The driving electrode 40 at the left side of FIG. 1 will be hereinafter referred to as "left-side driving electrode 40", and the driving electrode 41 at the right side of FIG. 1 will be hereinafter referred to as "right-side driving electrode 41".

Here, the left-side driving electrode 40 (right-side driving electrode 41) comprises a first driving electrode 40a (41a) disposed so as to confront the outer peripheral portion of the vibrator 30, and a second driving electrode 40b (41) disposed so as to confront the inner peripheral portion of the frame 31 of the vibrator 30, respectively.

A part of the second silicon substrate 12 fixed to the base portion 20 is located in the inner space surrounded by the inner peripheral portion of the right (left) frame portions 31 so as to serve as the right (left) in-frame fixed portion 60 in the inner space surrounded by the inner peripheral portion of the right (left) frame portion 31, so that the second driving electrode 40b (41b) is equipped to the right (left) in-frame fixed portion 60.

In this case, the right (left) frame portion 31 is partially cut out to have a cut-out portion 31a. The in-frame fixed portion 60 is designed so as to extend from the base potion 20 through the cut-out (or notch) portion 31a into the inner peripheral potion of the frame portion 31. More particularly, the in-frame fixed portion 60 is designed to have a substantially T-shaped form.

In this embodiment, the first and second driving electrodes 40, 41 are designed in a comb-shape, and these comb-shaped portions of the first and second driving electrodes are disposed so as to be engaged with the comb-shaped portions 30a, 30b projecting from the portions of the vibrator 30 which confront the respective driving electrodes 40, 41.

Furthermore, detecting electrodes 50 are formed in the second silicon substrate 12 so as to confront both outside portions of the detecting poise portion 32 in the y-direction. The detecting electrodes 50 detect the vibration (detection-vibration) of the detecting poise portion 32 which occurs in the y-direction when an angular velocity $\Omega$ around the z-axis perpendicular to the x-direction and the y-direction is applied under the driving-vibration of the vibrator 30, and outputs the detection result as a detection signal.

Here, the driving electrodes 40 and the detecting electrodes 50 are equipped with pads (pads 45 for the driving electrodes and pads 55 for the detecting electrodes) formed of aluminum or the like to electrically connect the driving electrodes 40 and the detecting electrodes 50 to a circuit portion (not shown) by wire bonding or the like.

Furthermore, the fixed portions of the driving beams 33 to the base portion 20 are equipped with pads 35 (pads for the vibrator) formed of aluminum or the like to electrically connect the vibrator 30 to the circuit portion described above by wire bonding or the like.

Figure 3:
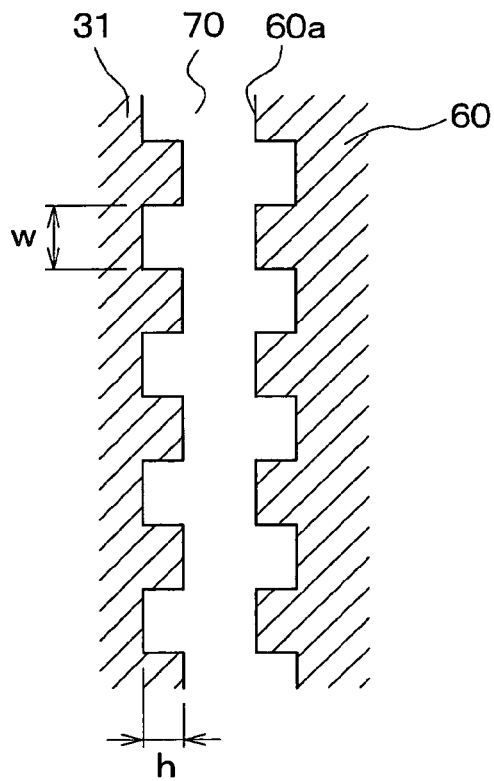
FIG. 3 is an enlarged plan view showing an unevenness-shaped portion in FIG. 1.

Still furthermore, according to this embodiment, both the back-side portion 60a of each in-frame fixed portion 60 which is located at the opposite side to the arrangement portion of the second driving electrode 40b, 41b and the inner peripheral portion of the frame portion 31 confronting the back side portion are designed to have an uneven shape (irregularities). FIG. 3 is an enlarged plan view of the unevenly-shaped portion.

In this embodiment, as shown in FIG. 3, the unevenly-shaped portion is designed to have rectangular irregularities (recesses and projections). At the confronting back-side gap 70, the unevenness pattern (period) of the uneven shape of the back-side portion 60a of the in-frame fixed portion 60 and the unevenness pattern (period) of the uneven portion of the inner peripheral portion of the frame portion 31 are arranged to be displaced from each other in a staggered configuration. More particularly, each projecting portion of one unevenly-shaped portion and each recess portion of the other unevenly-shaped portion confront each other.

For example, the depth of each recess portion (the height of each projecting portion) of the unevenly-shaped portions is set to about 3 µm, and the width w of each recess portion (the interval between the neighboring projecting portions) is set to about 9 µm. At the sites of the recess portions, the confronting back-side gap 70 is larger by the amount corresponding to the depth h of the recess portion as compared with the case where no unevenly-shaped portion is formed.

Furthermore, the recess portions are designed so that the width w thereof is not more than the upper limit of the etching width which is determined by the etching rule when the grooves are formed in the second silicon substrate 12 by etching.

Next, the method of manufacturing the angular velocity sensor S1 will be described by using a case where an SOI (silicon on insulator) substrate is used. FIGS. 4A to 4C and FIGS. 5A to 5D show the works in the respective steps of the manufacturing method of manufacturing the angular velocity sensor S1, and also are cross-sectional views corresponding to the cross-sectional view of FIG. 2.

Figure 4A:
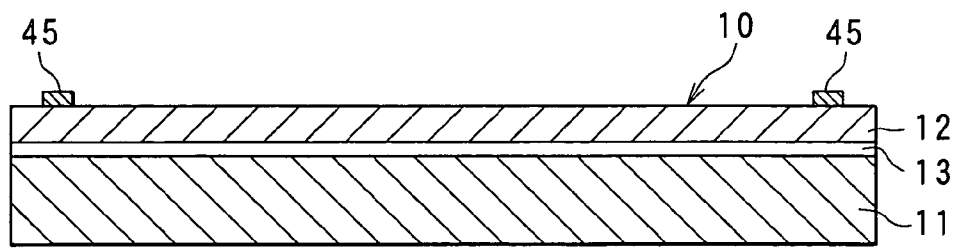
FIGS. 4A to 4C are diagrams showing a process flow of a manufacturing method of the angular sensor according to the embodiment.

First, an oxide film (for example, 1 µm in thickness) 13 is sandwiched between first and second substrates 11, 12 formed of monocrystal silicon to prepare an SOI substrate 10 as shown in FIG. 4A.

Thereafter, for example, phosphorus of high concentration is diffused ($N^+$-diffusion) into the overall surface of the second silicon substrate 12 to reduce the surface resistance value thereof and also reduce the contact resistance with the respective pads 35, 45, 55 (a pad 45 is shown in the figures) which will be formed of aluminum in the next step.

Subsequently, aluminum of, for example, 1 µm in thickness is deposited on the surface (second silicon substrate 12) of the SOI substrate 10, and then photo-etching is carried out to thereby form the respective pads 35, 45, 55.

Figure 4B:
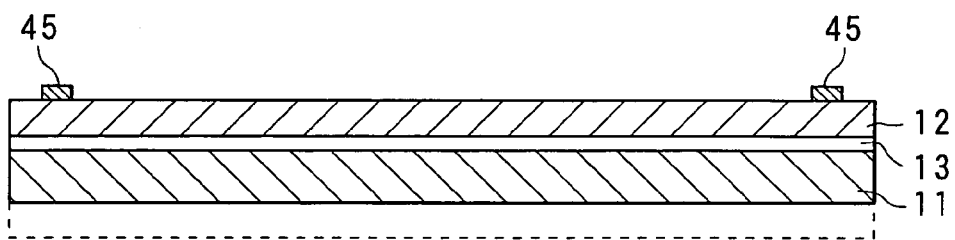

Subsequently, as shown in FIG. 4B, the back side (the first silicon substrate 11) of the SOI substrate 10 is subjected to a back-polishing treatment to set the thickness of the SOI substrate 10 to a predetermined thickness (for example, 300 µm) and also mirror-finish the back side of the SOI substrate 10.

Figure 4C:
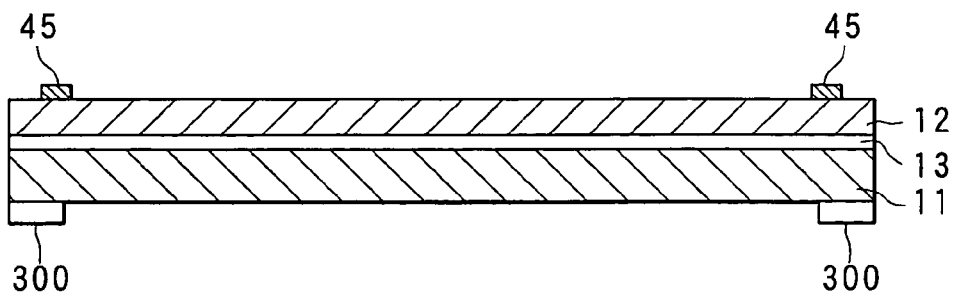

Subsequently, as shown in FIG. 4C, plasma SiN film 300 is deposited (for example, 0.5 µm) on the back side of the SOI substrate (first silicon substrate 11), a photo-pattern is formed and then the plasma SiN film 300 is etched, thereby opening a predetermined area.

Figure 5A:
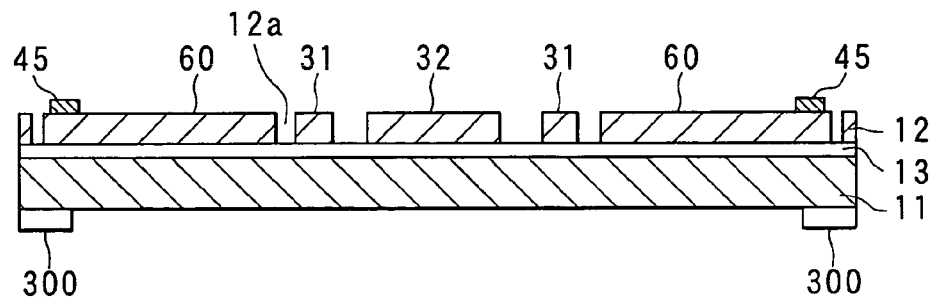
FIGS. 5A to 5D are diagrams showing a subsequent process flow of the manufacturing method to FIG. 4.

Subsequently, as shown in FIG. 5A, a pattern for sectioning the vibrator 30, the driving electrodes 40, 41, the detecting electrodes 50, the beams 33, 34, the unevenly-shaped portions in the confronting back-side gap 70, etc. is formed on the surface of the second silicon substrate 12 by using a resist, and it is subjected to dry etching to form a trench, that is, a groove 12 until the groove 12*a* reaches the oxide film 13.

Figure 5B:
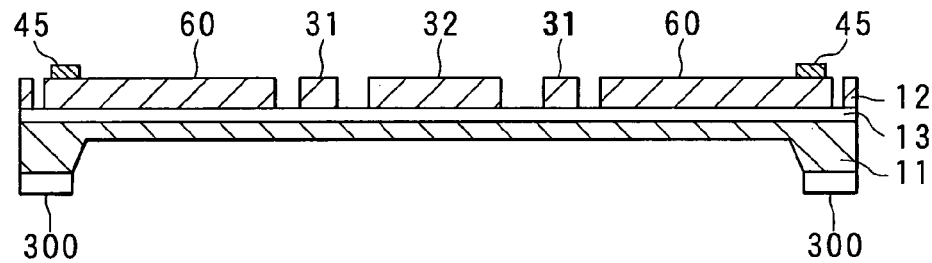

Subsequently, as shown in FIG. 5B, the first silicon substrate 11 is deeply etched with KOH water solution by using a pattern formed on the plasma SiN film 300 as a mask.

At this time, if the etching is promoted until it reaches the oxide film 13, the oxide film 13 would be broken and thus the SOI substrate 10 would be damaged due to pressure of et chant. Therefore, the etching time is managed so that the etching can be finished with silicon of the first silicon substrate 11 being left by 10 µm in thickness to avoid the oxide film 13 from being broken.

Figure 5C:
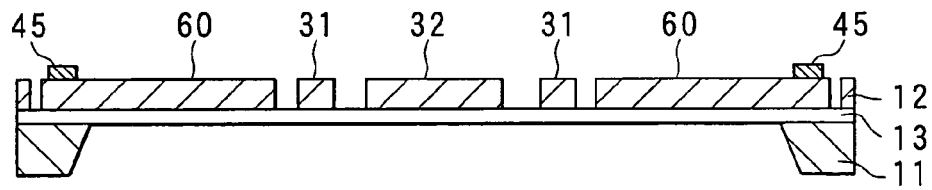

Subsequently, as shown in FIG. 5C, Si remaining in the step of FIG. 5B is etched and removed by plasma dry etching. At this time, the plasma SiN film 300 of the back side of the SOI substrate 10 is simultaneously removed.

Figure 5D:
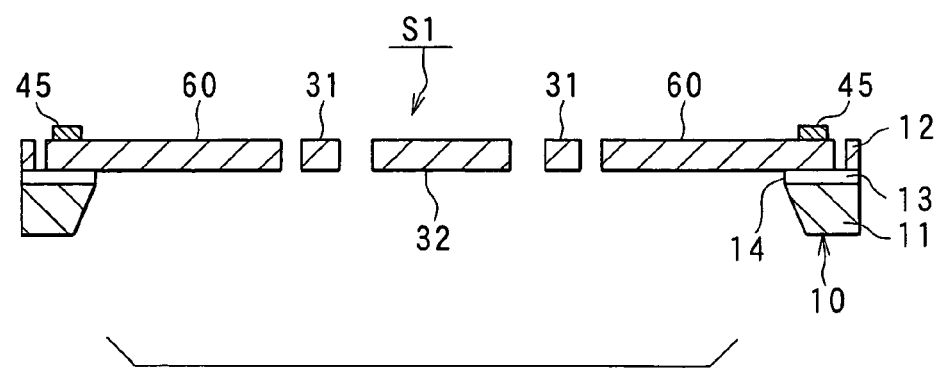
Figure 7:
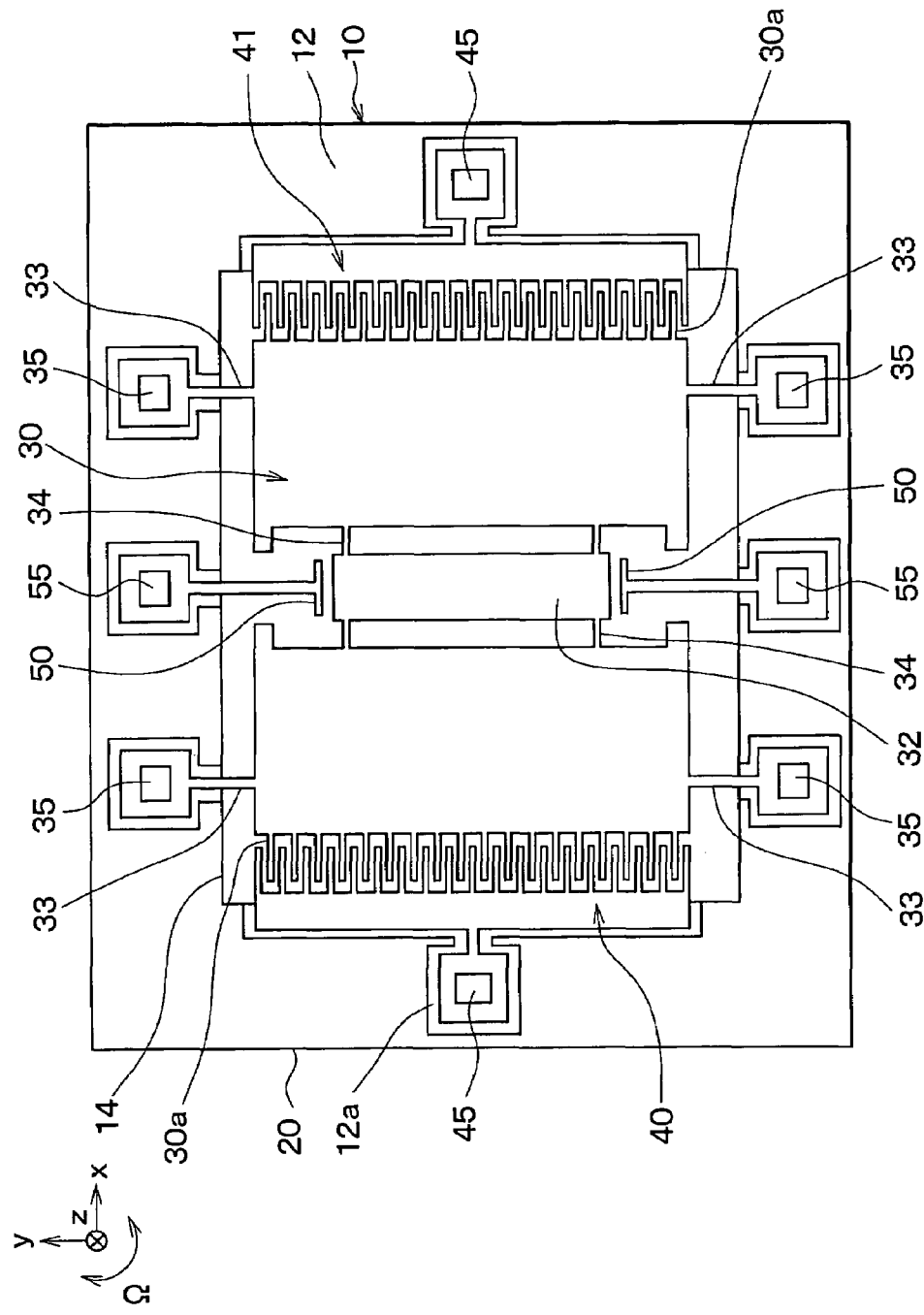
FIG. 7 is a schematic plan view showing an angular sensor produced as a first prototype by the inventor of this application.
Figure 8:
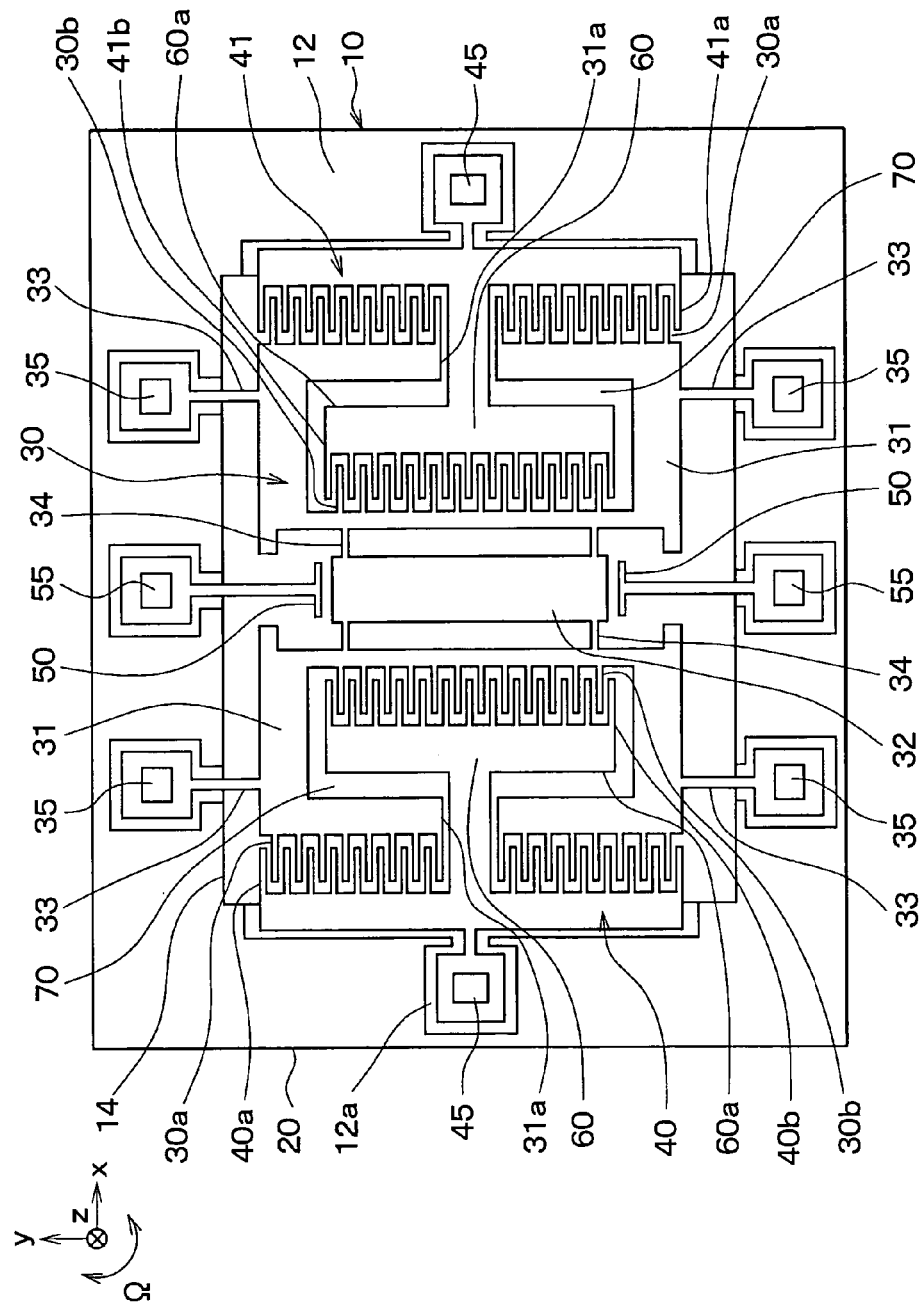
FIG. 8 is a schematic plan view showing an angular sensor produced as a second prototype by the inventor of this application.

Finally, as shown in FIG. 5D, the oxide film 13 is removed by dry etching to form the vibrator 30, etc. Through the above process, the angular sensor S1 is completed. Thereafter, each of the pads 35, 45, 55 is electrically connected to the circuit portion described above by wire bonding or the like.

In this embodiment, the angular velocity sensor is designed so that the width w of the recess portions shown in FIG. 3 is not more than the upper limit of the etching width determined by the etching rule when the second silicon substrate 12 is etched to form the grooves.

Therefore, by conducting the trench-etching on the second silicon substrate 12 shown in FIG. 5A, the respective parts such as the vibrator 30, etc. can be formed, and the unevenly-shaped portions can be properly formed in the confronting back-side gap 70.

Next, the operation of the angular velocity sensor S1 will be described.

A constant voltage is applied from the circuit portion described above to the vibrator 30 through the pads 35 for the vibrator, and also alternating voltages (driving signals) opposite in phase are applied to the right and left driving electrodes 40, 41 through the pads 45 for the driving electrodes. Under the application of these voltages, electrostatic force (that is, electrostatically attractive force) occurs between the comb-shaped portions 30*a*, 30*b* of the vibrator 30 and the driving electrodes 40, 41 at the right and left sides, and the overall vibrator 30 is driven and vibrated in the x-direction by the driving beams 33.

When the angular velocity $\Omega$ around the z-axis is applied under the driving-vibration of the vibrator 30, Coriolis force is applied to the vibrator 30 in the y-direction, and the detecting poise portion 32 of the vibrator 30 vibrates (detection-vibrates) in they-direction by the detecting beams 34. Accordingly, the electrostatic capacitance between the detecting electrodes 50 and the detecting poise portion 32 is varied by the detecting-vibration, and the magnitude of the angular speed $\Omega$ can be determined by detecting the capacitance variation.

According to this embodiment, the vibrator 30 is designed in a frame shape, and the driving electrodes (that is, the second driving electrodes 40*b*, 41*b*) are also equipped in the frame portions 31. Therefore, the increase of the body size of the substrate 10 can be suppressed at maximum, and the increase of the number of driving electrodes having a high area efficiency can be promoted.

Furthermore, the unevenly-shaped portions are properly formed in the confronting back-side gap 70 by etching the second silicon substrate 12, and the confronting back-side gap 70 is increased at the recess portion sites, so that the electrostatic force acting on the confronting back-side gap 70 can be reduced.

Therefore, in this embodiment, the number of comb teeth is increased by the second driving electrodes 40*b*, 41*b*, so that the driving force and the driving vibration speed are increased in conformity with the increase of the comb teeth. Accordingly, there can be provided an electrostatic vibration type angular velocity S1 which can properly increase the driving force with keeping the etching rule and suppressing the increase of the body size at maximum.

OTHER EMBODIMENTS

Figure 6:
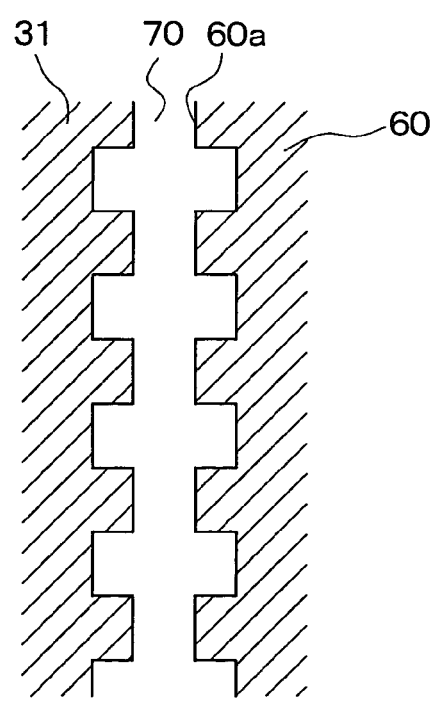
FIG. 6 is a plan view showing another example of the unevenness-shaped portion.

In the embodiment shown in FIG. 3, the uneven-shape pattern (period) of the back-side portion 60*a* of the in-frame fixed portion 60 and the uneven-shape pattern (period) of the inner peripheral portion of the frame portion 31 are arranged to be displaced from each other in phase (i.e., they are arranged in a staggered configuration). However, both the uneven-shape patterns (periods) may be arranged with no displacement in phase as shown in FIG. 6 (i.e., they are arranged so that the projecting portions thereof confront each other while the recess portions thereof confront each other).

Each uneven portion (recess or projection) of the unevenly-shaped portions is designed in a planar rectangular shape, however, the shape of the uneven portion may be a triangular shape, a trapezoidal shape, a semi-circular shape, a saw-tooth shape or the like in the above embodiment, and various geometric shapes may be used for the planar shape of the uneven portion.

Figure 9A:
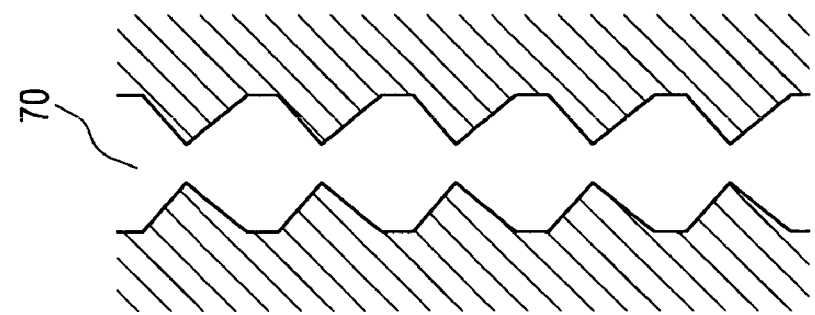
FIGS. 9A–9B are plan views of alternative implementations of the unevenness-shaped portion.
Figure 9B:
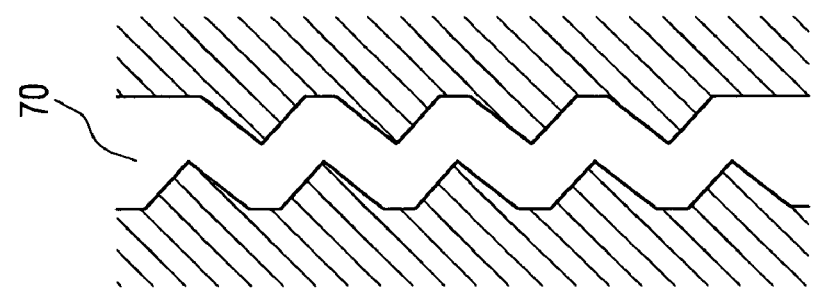
Figure 9C:
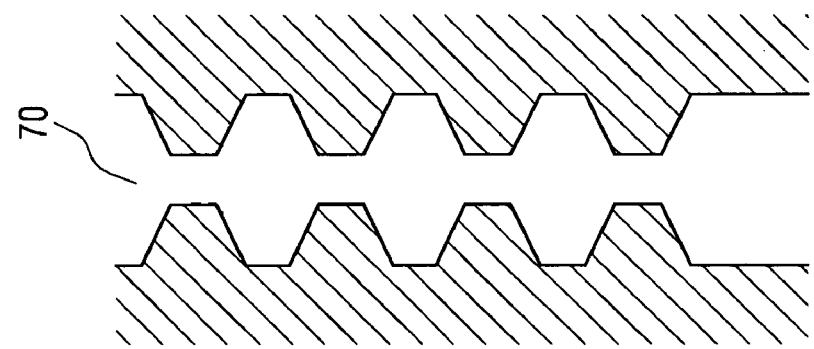

Referring to FIGS. 9A and 9C, exemplary back-side gaps 70 are shown in which the unevenly-shaped portions have a trapezoidal and triangular shape, respectively and are displaced in phase.

Figure 9D:
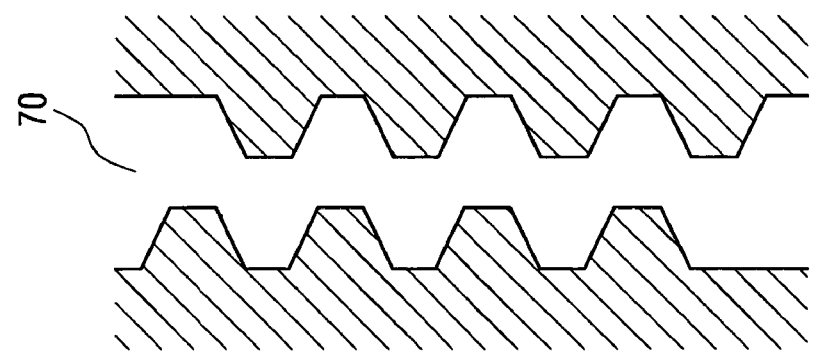

Referring to FIGS. 9B and 9D, exemplary back-side gaps 70 are shown in which the unevenly-shaped portions have a trapezoidal and triangular shape, respectively and are arranged so that the projecting portions thereof confront each other while the recess portions thereof confront each other.

Furthermore, in the confronting back-side gap 70, the unevenly-shaped portion may be formed at only the back-side portion 60a of the in-frame fixed portion 60, or at only the inner peripheral portion of the frame portion 31 confronting the back-side portion 60a.

In addition to the angular velocity sensor described above, this invention may be applied to an electrostatic vibration type actuator or the like. In short, this invention is applicable to an electrostatic vibration type device having such a structure that a base portion, a vibrator and a driving electrode are formed by etching a substrate, the vibrator is designed in a frame shape and the driving electrode is also equipped in the frame portion.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A device having a vibrator that is driven electrostatically, the device comprising:
   a substrate;
   a vibrator movably supported by the substrate so as to vibrate in a predetermined direction, wherein the vibrator includes a frame portion having a planar frame shape;
   an in-frame fixed portion that is fixed to the substrate and located in an inner space surrounded by an inner peripheral portion of the frame portion; and
   a driving electrode for applying electrostatic force to the vibrator to drive the vibrator so that the vibrator vibrates in the predetermined direction, wherein the driving electrode comprises:
      a first driving electrode disposed to confront an outer peripheral portion of the vibrator; and
      a second driving electrode disposed on a first side of the in-frame fixed portion and disposed so as to confront the inner peripheral portion of the frame portion, the second driving electrode being further electrically connected to the first driving electrode to cooperatively apply the electrostatic force to the vibrator in a same direction as the first driving electrode,
   wherein at least one of a portion of the in-frame fixed portion located opposite to the first side on which the second driving electrode is disposed, and a side portion of the inner peripheral portion of the frame portion confronting the second side portion of the in-frame fixed portion is designed to have an unevenly-shaped portion.

2. The device according to the claim 1, wherein both the second side portion of the in-frame fixed portion and the side portion of the inner peripheral portion of the frame portion which confronts the second side portion are designed to have the unevenly-shaped portion.

3. The device according to claim 2, wherein the unevenly-shaped portion of the second side portion of the in-frame fixed portion and the unevenly-shaped portion of the inner peripheral portion of the frame portion which confronts the second side portion are arranged to be displaced from each other in phase.

4. The device according to claim 2, wherein the unevenly-shaped portion of the second side portion of the in-frame fixed portion and the unevenly-shaped portion of the inner peripheral portion of the frame portion have a shape selected from a group consisting of a planar rectangular shape, a triangular shape, a trapezoidal shape, a semi-circular shape and a saw-tooth shape.

5. The device according to claim 1, wherein the frame portion is partially cut out to form a notch portion in the frame portion, and the in-frame fixed portion extends from the substrate through the notch portion into the inner peripheral portion of the frame portion.

6. A device having a vibrator that is driven electrostatically, the device comprising:
   a substrate;
   a vibrator movably supported by the substrate so as to vibrate in a predetermined direction, wherein the vibrator includes a frame portion having a planar frame shape;
   an in-frame fixed portion that is fixed to the substrate and located in an inner space surrounded by an inner peripheral portion of the frame portion; and
   a driving electrode for applying electrostatic force to the vibrator to drive the vibrator so that the vibrator vibrates in the predetermined direction, wherein the driving electrode comprises:
      a first driving electrode disposed to confront an outer peripheral portion of the vibrator; and
      a second driving electrode equipped to a first side of the in-frame fixed portion and disposed to confront the inner peripheral portion of the frame portion,
   wherein at least one of a second side portion of the in-frame fixed portion located opposite to the side on which the second driving electrode is disposed, and a side portion of the inner peripheral portion of the frame portion confronting the second side portion of the in-frame fixed portion has an unevenly-shaped portion, and wherein the frame portion is partially cut out to form a notch portion in the frame portion, and the in-frame fixed portion extends from the substrate through the notch portion into the inner peripheral portion of the frame portion.

7. A device having a vibrator that is driven electrostatically, the device comprising:
- a substrate;
- a vibrator movably supported by the substrate, the vibrator being driven by an electrostatic force being applied thereto and comprising a frame portion having a planar frame shape; and
- an in-frame fixed portion that is fixed to the substrate and located in an inner space surrounded by an inner peripheral portion of the frame portion, wherein the in-frame fixed portion has a side portion and the inner peripheral portion has a side portion, wherein a capacitor is generated between the side portion of the in-frame fixed portion and the side portion of the inner peripheral portion, wherein at least one of the side portion of the in-frame fixed portion and the side portion of the inner peripheral portion of the frame portion confronting the side portion of the in-frame fixed portion is designed to have an unevenly-shaped portion so that an electrostatic force to be generated in the capacitor is smaller than the electrostatic force for driving the vibrator.

8. The device according to claim 7, wherein both the side portion of the in-frame fixed portion and the side portion of the inner peripheral portion of the frame portion are designed to have the unevenly-shaped portion.

9. The device according to claim 8, wherein the unevenly-shaped portion of the side portion of the in-frame fixed portion and the unevenly-shaped portion of the inner peripheral portion of the frame portion are arranged to be displaced from each other in phase.

10. The device according to claim 8, wherein the unevenly-shaped portion of the side portion of the in-frame fixed portion and the unevenly-shaped portion of the inner peripheral portion of the frame portion have a shape selected from a group consisting of a planar rectangular shape, a triangular shape, a trapezoidal shape, a semi-circular shape and a saw-tooth shape.

11. A device having a vibrator driven electrostatically, comprising:
- a substrate;
- a vibrator movably supported by the substrate being movable in a predetermined direction, the vibrator comprising a first movable electrode and a second movable electrode equipotentially displaced from the first movable electrode;
- a first driving electrode disposed to face the first movable electrode to form a first capacitor for applying electrostatic force to the vibrator to drive the vibrator in one direction along the predetermined direction; and
- a second driving electrode disposed between the first movable electrode and the second movable electrode, and equipotentially provided to the first driving electrode, wherein the second driving electrode faces the second movable electrode to form a second capacitor for cooperatively applying electrostatic force to the vibrator with the first capacitor to drive the vibrator in the predetermined direction;
- wherein at least one of a side portion of the first movable electrode at an opposite side of the first driving electrode, and a side portion of the second driving electrode at an opposite side of the second movable electrode has an unevenly shaped portion.

12. The device according to claim 11, wherein both the side portion of the first movable electrode and the side portion of the second driving electrode have the unevenly shaped portion.

13. The device according to claim 12, wherein the unevenly-shaped portion of the first movable electrode and the unevenly shaped portion of the second driving electrode are arranged to be displaced from each other in phase.

14. The device according to claim 12, wherein the unevenly-shaped portion of the first movable electrode and the unevenly shaped portion of the second driving electrode have a shape selected from a group consisting of a planar rectangular shape, a triangular shape, a trapezoidal shape, a semi-circular shape and a saw-tooth shape.

* * * * *